United States Patent [19]

Fisher et al.

[11] Patent Number: 5,294,977
[45] Date of Patent: Mar. 15, 1994

[54] TELEVISION SIGNAL DETECTION APPARATUS

[76] Inventors: David Fisher; Lawrence Tyson, both of 32 Biggin Way, Upper Norwood, London, Great Britain, SE19 3XF

[21] Appl. No.: 775,938

[22] PCT Filed: May 3, 1990

[86] PCT No.: PCT/GB90/00687
§ 371 Date: Nov. 4, 1991
§ 102(e) Date: Nov. 4, 1991

[87] PCT Pub. No.: WO90/13974
PCT Pub. Date: Nov. 15, 1990

[30] Foreign Application Priority Data

May 3, 1989 [GB] United Kingdom ............... 8910071

[51] Int. Cl.⁵ .................................. H04N 7/10
[52] U.S. Cl. ............................ 348/4; 455/2; 348/725
[58] Field of Search ............. 455/2, 6.1, 6.3, 4.1; 358/84, 86, 181

[56] References Cited

U.S. PATENT DOCUMENTS 4,057,829  11/1977  Moorehead ................... 358/84

FOREIGN PATENT DOCUMENTS 3401762  8/1985  Fed. Rep. of Germany.

*Primary Examiner*—Jin F. Ng
*Assistant Examiner*—Andrew Faile
*Attorney, Agent, or Firm*—Sherman and Shalloway

[57] ABSTRACT

An apparatus and method for detecting and logging video outputs from a central control unit to one or more television receivers in which a remote unit in or in proximity to the or each television receiver detects by means of a tuned circuit the horizontal synchronization signal frequency of the receiver; the detected signal is modulated and fed to the central control unit where it is demodulated to produce a signal corresponding to the phase of the receiver horizontal synchronization signal characteristic of that receiver, the phase of the time synchronization signal of each of a plurality of video players is compared with the phase of the fed receiver signal to obtain a match; and a microprocessor logs the matched signals.

6 Claims, 2 Drawing Sheets

5,294,977

TELEVISION SIGNAL DETECTION APPARATUS

BACKGROUND OF THE INVENTION

1. Field of the Invention

The present invention relates to a television signal detection apparatus for determining which of several television programs is being displayed at a television receiver.

2. Description of the Related Art

In a hotel where each hotel room has a television receiver which can be fed with a selection of programs from a centralized bank of video tape players it is a requirement to log the use of the receiver so that the viewer can be charged for the particular program selected. In order to carry out the logging function standard receivers are modified by providing an additional connection between each receiver and a central logging device. Modification of each receiver is clearly expensive. Alternatively a separate switching device is provided at each receiver which also requires additional connections between each receiver and a central logging device.

SUMMARY OF THE INVENTION

Television signal apparatus according to the present invention comprises a remote unit locatable in or in proximity to a television receiver and a central control unit locatable at a position remote from the remote unit, the remote unit having a tuned circuit tuned to the horizontal synchronisation signal frequency of the receiver, a detector circuit for converting the output of the tuned circuit to a modulating signal, and a modulator for frequency modulating a carrier signal, the central control unit having a demodulator arranged to receive the modulated carrier signal and demodulate the carrier signal to produce a signal corresponding to the phase of the receiver horizontal synchronisation signal characteristic of that receiver, the central control unit further having a means to detect the phase of the line synchronisation signal of each of a plurality of video tape players, a comparator to compare the receiver and player synchronisation signals to obtain a match and a microprocessor to log matched signals wherein a header code is joined with the signal corresponding to the phase of the or each receiver, synchronisation signal whereby that signal may be identified as characteristic of a particular said receiver.

A method of logging video output received by a television receiver from a central control unit according to another aspect of the invention comprises detecting the horizontal synchronization signal frequency of the receiver in a unit in or in proximity to the receiver, modulating the detected synchronisation signal and feeding the modulated signal to the central control unit, demodulating the fed signal to produce a signal corresponding to the phase of the receiver horizontal synchronisation signal characteristic of that receiver, detecting the phase of a line synchronisation signal of each or one of a plurality of video players and comparing the receiver and player synchronisation signals to obtain a match and logging matched signals wherein a header code is joined with the signal corresponding to the phase of the or each receiver synchronisation signal whereby that signal may be identified as characteristic of a particular said receiver.

The characteristics of the apparatus of the invention enable the use of existing coaxial cables between a selected one of the players and a particular receiver to feed detected signals from the remote unit to the central control unit without providing additional cables and without expensive modification of the receiver. The remote unit can be fixed in a simple way to the back of the receiver. The header code is joined with each signal corresponding, to the phase of the or each receiver synchronization signal so that the signal can be identified as characteristic of a particular said receiver.

In a preferred embodiment a simple security circuit can be provided in the remote unit to cause an alarm signal to be fed to the central unit in the event of unauthorized removal of a receiver.

BRIEF DESCRIPTION OF THE DRAWINGS

An embodiment of the present invention will now be described with reference to the accompanying drawings in which.

DESCRIPTION OF THE PREFERRED EMBODIMENTS

Figure 1:
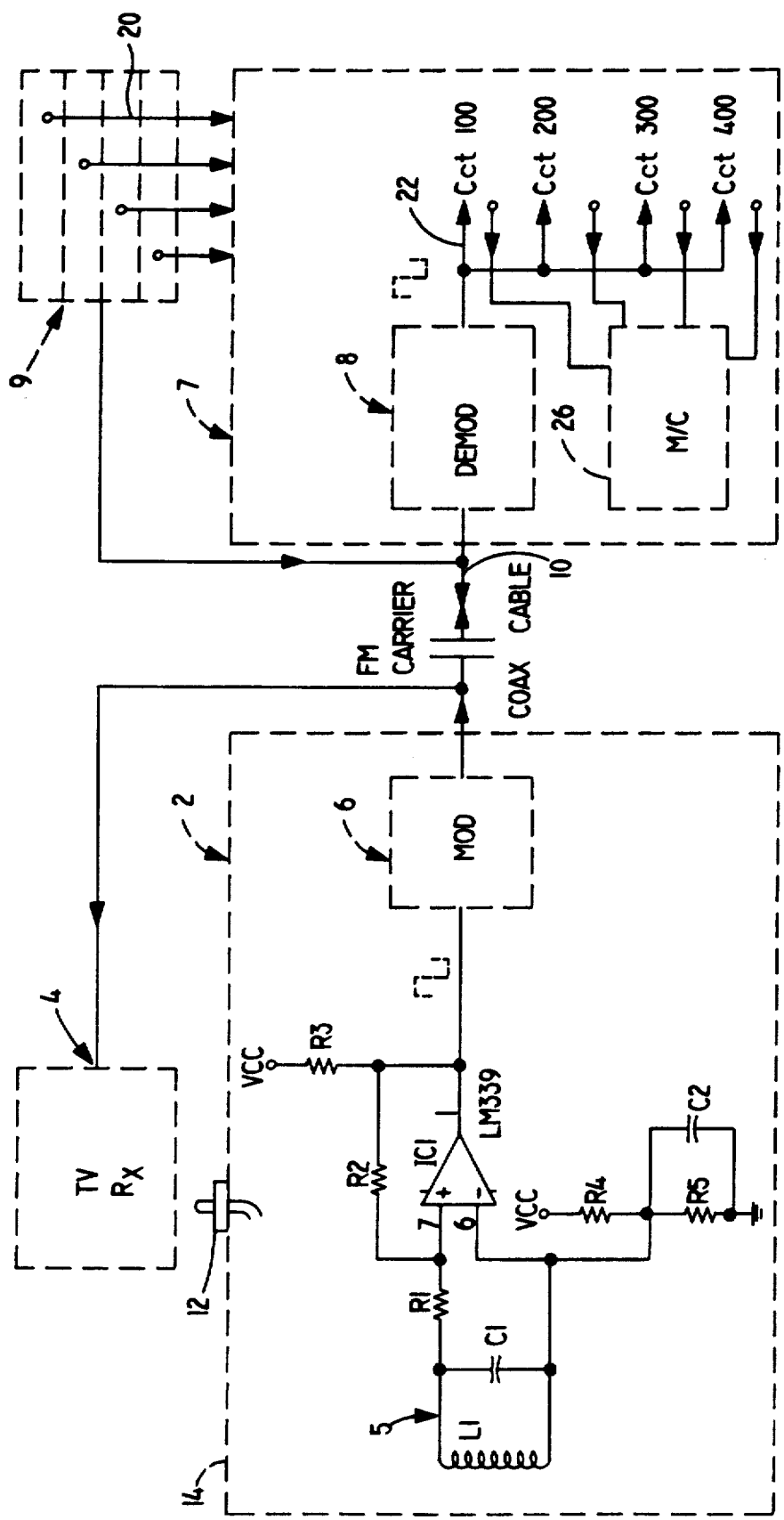
FIG. 1 shows the circuitry for one remote unit in the apparatus of the invention.

In the apparatus of the invention any number of remote units may be provided depending on the number of television receivers. Only one such unit 2 is shown in FIG. 1. Unit 2 is located in close proximity to a television receiver 4 preferably at the rear. A tuned circuit 5 comprising coil L1 and capacitor C1 in unit 2 is tuned to 15625 Hz the horizontal scanning frequency of receiver 4.

This tuned circuit when the receiver is turned on produces a 15625 Hz sine wave which has a fixed phase relationship to the horizontal scanning activity of the receiver. The output of the tuned circuit may vary in amplitude between 10 mV and 3 V depending upon the make and design of the receiver.

A zero crossing detector circuit comprising comparator IC1 R1, R2, R3 and C2 converts the output of the tuned circuit to a square wave of amplitude 5 V. This signal is used to frequency modulate a suitable carrier in modulator 6 to be fed via coaxial cable 10, used to connect a bank of video tape players 9 to receiver 4, to central control unit 7 where the modulated signal is demodulated by demodulator 8.

In a suitable comparator which will be described with reference to FIG. 2 the demodulated signal is compared with the phase of the line synchronization signal of each of a plurality of video tape players 9.

In order for the central control unit to identify which remote unit 2 of a number of units is communicating to it a header code is joined with the signal corresponding to the phase of the receiver synchronization signal so that that signal is identified as characteristic of that particular receiver.

A simple contact switch 12 on a surface of the housing 14 of unit 2 at a point where it is fixed to the outside of receiver 4 enables an alarm to be activated if the receiver 4 is detached from the unit 2. This helps to protect the receiver from unauthorized removal and can be arranged to alert the hotel staff.

Figure 2:
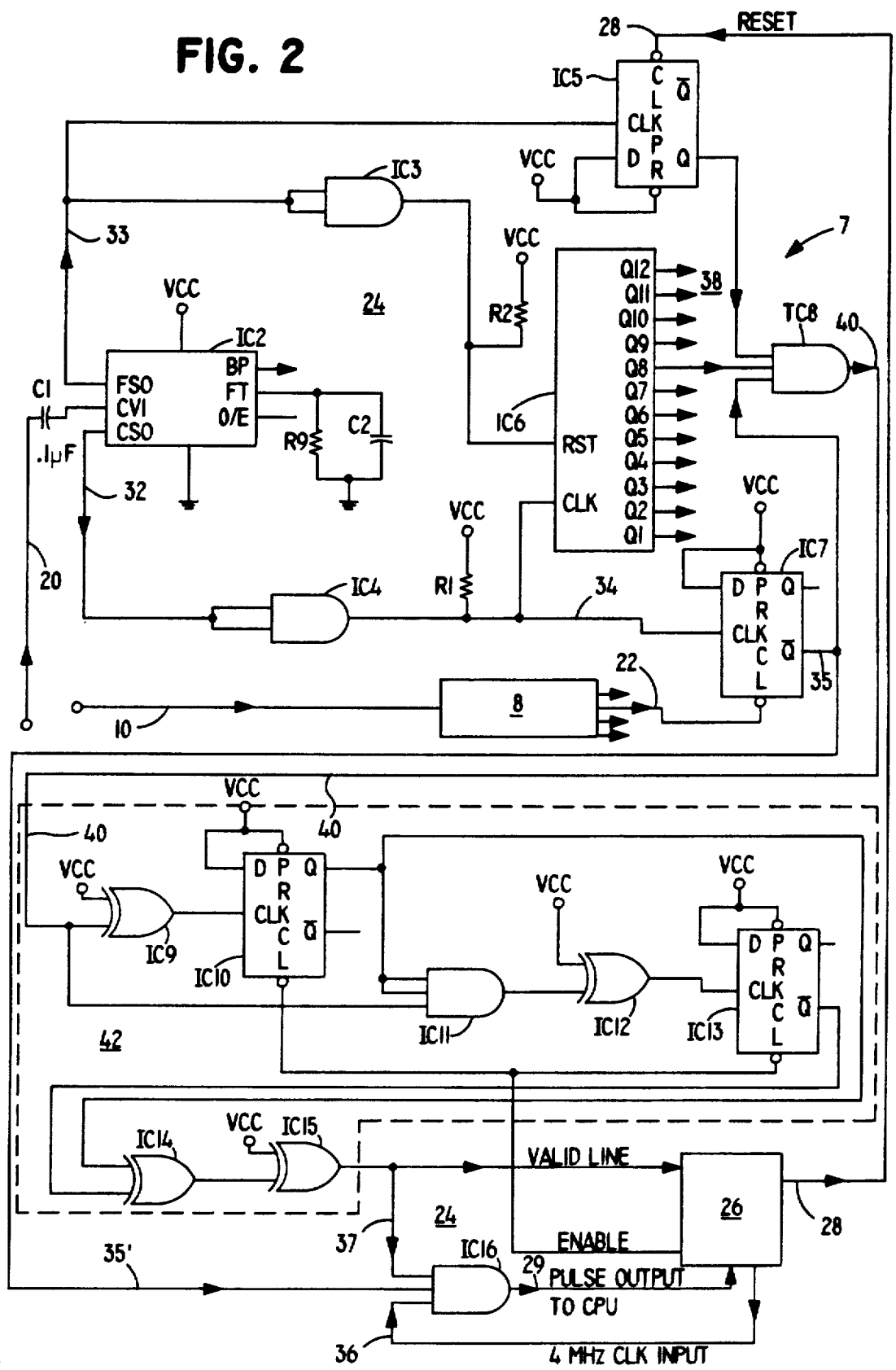
FIG. 2 shows the circuitry for the central control unit for the apparatus of the invention.

In FIG. 2 the control unit 7 is shown but with only one video player input 20 and one input 22 from demodulator 8. In a full system several video players and a corresponding number of phase comparator circuits 24 would be provided.

Each phase comparator circuit 24 is under the control of and provides information to a microprocessor 26.

The exact mode of operation of the microprocessor 26 is not important to a description of circuit function, it is merely necessary to consider the microprocessor as being able to control the state of an enable line 27, a reset line 28 and as being able to count a group of pulses from line 29.

The function of this comparator circuit 24 is to enable the phase of line synchronization pulses on line 20 from the video cassette player 9 and demodulated pulses on line 22 from the remote unit 8 to be presented in a digital form to the microprocessor 26.

Further it is desired to compare only the phase of one line synchronization pulse and one demodulated pulse per TV picture field, this comparison taking place 129 lines after the field synchronisation pulse.

The action of the circuit will be described assuming a composite video input to IC2 and a steady stream of demodulated pulses from the remote unit 8.

A synchronisation separation circuit based around IC2 a dedicated synchronisation separation circuit manufactured by National part No. LM 1881 separates line and field synchronisation pulses from the composite video signal.

The two outputs from IC2 are a composite synchronization output (cso) on line 32 and a field synchronization output (fso) on line 33.

The presence of field synchronization pulses in the cso output 32 is unimportant and the output cso will be considered as merely a source of line synchronization pulses.

IC2 thus makes available to subsequent circuitry line and field synchronization pulses with repetition rates of 15625 and 50 Hz respectively.

The basic phase comparison is made by a set reset latch IC7, the latch being set by a line synchronization pulse on line 34 and cleared by a demodulated pulse on line 22, the output of IC7 on line 35 is thus high for a period of time corresponding to the difference in phase between line synchronization and demodulated pulses.

By gating with AND gate IC16 the output of IC7 on lines 35 and 35' with a 4 MHz clock signal from line 36 and a "valid line" signal from line 37 a burst of 4 MHz pulses will be produced on line 29 once per TV field, the duration of the burst and hence the number of pulses it contains is proportional to the phase difference between line synchronization and demodulated pulses.

The pulses present at the output 29 of IC16 may be counted by the controlling microprocessor 26 so that the microprocessor may determine the phase relationship between line synchronization and demodulated pulses.

The function of the input "valid line" 37 to the three input AND gate IC16 is, as discussed, to permit one phase comparison to be made per TV field. It will be noted from the circuit diagram in FIG. 2 that an output is only available from IC16 if the "valid line" input to IC16 is in the high state.

This condition is true once per TV field and the signal "valid line" is obtained by counting line synchronization pulses from IC2 using a ripple counter IC6 National part No. MC 14 4040 'CP. As the counter is reset to zero by field synchronization pulses the counter output Q8 on line 38, will go high 128 line pulses after each field synchronization pulse.

The set-reset latch IC7 is constantly presented with both line synchronization pulses and demodulated pulses so that the output on line 35 of this latch is continually changing state at the TV horizontal scan rate of 15625 Hz.

At some point in time the controlling microprocessor 26 will require an output from the phase comparator and will accordingly take the "enable" line 27 high to the circuit and issue a negative-going reset pulse to the "reset" input on line 28 of the circuit.

The set-reset latch IC7 is cleared by a reset pulse derived from the controlling microprocessor 26 and set by the arrival of the next field synchronization pulse. The object of this latch IC7 is to cause the output 40 of an AND gate IC8 to remain low, irrespective of the state of its other inputs, until a field synchronization pulse has occurred.

128 line synchronization pulses after the field synchronization pulse the "Q8" output on line 38 of the counter IC6 goes high so that the output of the gate IC8 on line 40 now reflects the state of the output on line 35 of the phase comparator set-reset latch IC7.

IC's 9, 10, 11, 12, 13, 14 and 15 form a "second pulse detector" circuit 42 so that the first output pulse on line 40 from IC8 is ignored, the second output pulse is selected and subsequent output pulses are ignored, thus only the result of the phase comparison made at line 129 is available as the "valid line" input 37 to IC16.

The second pulse detector circuit 42 functions as follows:

The preset/clear latches IC10, IC13 have an initial condition defined by the action of the "ENABLE" input to the circuit. This input acts directly on the active low clear inputs of IC10 and IC13, so that when the "ENABLE" input is taken high the Q output of IC10 is set at a logic 0 and the Q output of IC13 is set at a logic 1. These outputs are applied directly to the two inputs of the EOR gate IC14, so that the output of IC14 is at a logic level 1.

The first output pulse from IC8 after inversion by IC9 clocks the active low clock input to IC10, so that the output Q of IC10 assumes a logic 1 after the first pulse. Both inputs to IC14 are now at logic level 1 so that its output is at logic level 0. This output after inversion by IC15 forms the "VALID" output and is also an input to the three input AND gate IC16.

The second output pulse from IC8 has no further effect on IC10 but is applied to one input of IC11, a two input AND gate, which has as its other input, the Q output of IC10. The output of IC11 therefore goes high for the duration of the second output pulse from IC8. The output of IC11 is inverted by IC12 and applied to the active low clock input of the preset/clear latch IC13. The Q output of IC13 therefore goes low after the second pulse from IC8.

The third and subsequent pulses from IC8 have no effect on the state of IC13.

It will be seen that the inputs to the two input EOR gate IC14 are both at logic level 1, only for the period of time commencing at the end of the first pulse from IC8, and terminated by the end of the second pulse from IC8.

The output of IC14 after inversion by IC16 provides a "VALID" signal which is only TRUE for line 129 of the TV picture field.

IC's 3 and 4 are part National SN Nos. 7400. Latch IC's 5, 7, 10 and 13 are part Nos. 7474. Gates IC's 8, 11 and 16 are National SN part Nos. 7411 and IC's 9, 12, 14 and 15 are National SN part Nos. 4LS86.

In a preferred embodiment, the above apparatus will modulate the video TV signals on a UHF carrier suitable for direct reception by a standard TV receiver. The horizontal synchronizing signal of each video signal is extracted and the phase compared with the phase of the demodulating signal received from the remote unit. The comparison method used is sufficiently selective so that a direct and unambiguous output is available as to which if any of the modulated signals is being received by the TV receiver.

The apparatus according to the invention enables a particular TV channel to which the TV receiver is tuned to be determined at a remote location by control unit 7. No modification is needed for the TV receiver, neither do additional data carrying lines need be required between the control unit and TV receiver.

We claim:

1. Television signal detection apparatus comprising a remote unit locatable in or in proximity to a television receiver and a central control unit locatable at a position remote from the remote unit, the remote unit having a resonant tuned circuit tuned to a horizontal synchronization signal frequency of the receiver, a detector circuit for converting the output of the tuned circuit to a modulating signal, and a modulator for frequency modulating a carrier signal with said modulating signal the central control unit having a demodulator arranged to receive the modulated carrier signal and demodulate the carrier signal to produce a signal corresponding to the phase of the horizontal synchronization signal of said receiver, the central control unit further having a means to detect a phase of a line synchronization signal of each of a plurality of video tape players selectively connectable to said receiver, a comparator to compare the phase of said horizontal synchronization signal of said receiver with the phase of each of said line synchronization signals to determine whether both signals are matched and a microprocessor to log matched signals, wherein a header code is joined with the signal corresponding to the phase of said receiver synchronization signal whereby the signal is uniquely identified as characteristic of said television receiver.

2. Apparatus as claimed in claim 1 wherein said television receiver has said remote unit fixed to it and a security circuit comprises a contact switch on a surface of said remote unit at a point where it is fixed to the outside of said receiver whereby separation of the unit from said receiver causes an alarm to be activated.

3. Apparatus as claimed in any one of claims 1 or 2 wherein the comparator is enabled to present the phase of said line synchronization signal from said video tape player and the demodulated signal corresponding to the phase of said horizontal synchronization signal from the remote unit in a digital form to the microprocessor.

4. Apparatus as claimed in claim 3 wherein the comparator is provided with means to compare only the phase of one line synchronization signal and one demodulated signal per television picture field.

5. Apparatus as claimed in claim 4 wherein the comparator is enabled to compare the synchronization signal and the demodulated signal at a line substantially in the middle of the TV picture field.

6. A method of logging a video output received by a television receiver from a central control unit comprising detecting the horizontal synchronization signal frequency of the receiver in a unit in or in proximity to the receiver, modulating the detected synchronization signal and feeding the modulated signal to the central control unit, demodulating the fed signal to produce a signal corresponding to the phase of the receiver horizontal synchronization signal detecting a phase of a line synchronization signal of each of a plurality of video players selectively connectable to said receiver and comparing said signal corresponding to the phase of the receiver horizontal synchronization signal and said phase of said line synchronization signal of each of said video players to obtain a match and logging matched signals wherein a header code is joined with the signal corresponding to the phase of said receiver synchronization signal whereby the signal is uniquely identified as characteristic of said television receiver.

* * * * *